Nov. 2, 1926.
H. D. BLAKE
LIQUID LEVEL INDICATING APPARATUS
Filed Oct. 24, 1922
1,605,387
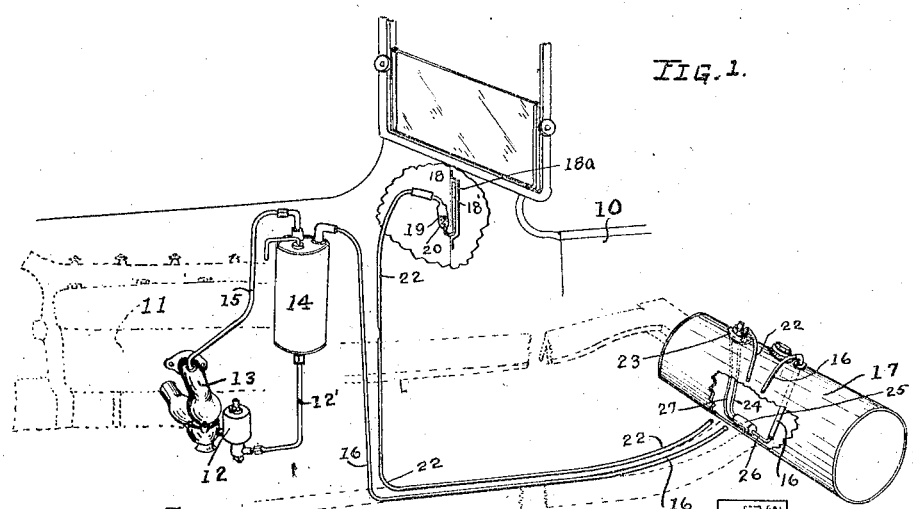
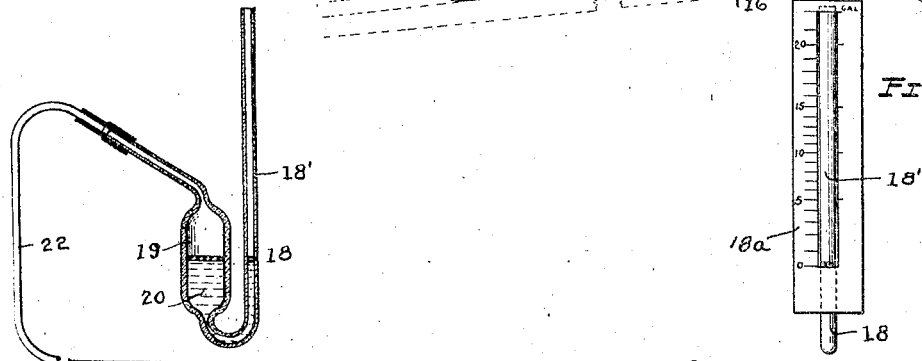
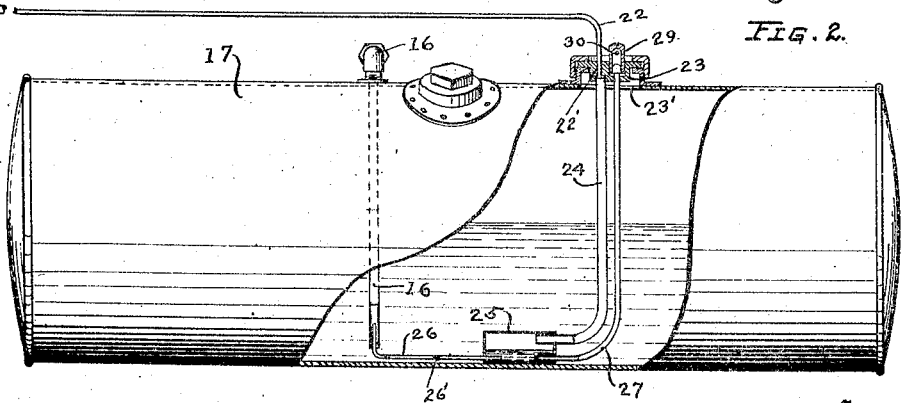
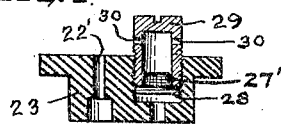
Inventor
H. D. BLAKE.
By Geo A Pitts
Attorney Patented Nov. 2, 1926.

1,605,387

UNITED STATES PATENT OFFICE.

HAROLD D. BLAKE, OF CLEVELAND, OHIO, ASSIGNOR OF ONE-HALF TO GEORGE B. PITTS, OF CLEVELAND, OHIO.

LIQUID-LEVEL INDICATING APPARATUS.

Application filed October 24, 1922. Serial No. 596,641

The present invention relates to apparatus for indicating liquid levels in liquid holders or other containers, for example, the fuel tanks of motor vehicles.

One object of the invention is to provide an improved level indicating apparatus capable of accurately indicating at all times the level of the liquid in a tank or holder.

Another object of the invention is to provide, in an apparatus having a static pressure system, for indicating liquid levels in a holder, means for supplying air to the system, to replace that which may be absorbed by the liquid in the holder or be lost by change in temperature within the system or leakage.

Another object of the invention is to provide in a static liquid level indicating apparatus, means for maintaining a sufficient volume of air in the trap of the apparatus, whereby the indicating column will accurately show the rise or fall of the level of the liquid contained in the liquid holder.

A further object of the invention is to provide a liquid level indicating apparatus in the form of a container or trap, which communicates at its upper end with a hydrostatic pressure gage and at its lower end with the interior of the holder to receive pressure therefrom proportionate to the height of the liquid column in the holder.

Other objects of the invention will be apparent to those skilled in the art to which my invention relates from the following description taken in connection with the accompanying drawing.

In the drawings, Fig. 1 is a perspective view of a portion of a vehicle and a fuel feeding system of the vacuum type showing an apparatus embodying my invention applied thereto.

Fig. 2 is a side elevation, partly in section and partly diagrammatic, of the fuel tank and the indicating apparatus.

Fig. 3 is a face view of the gage indicator or scale.

Fig. 4 is a vertical section through the cap for the fuel tank or holder.

Referring to the drawing, 10 designates, conventionally, the body of a motor vehicle having the usual internal combustion engine 11 provided with a carburetor 12, which is connected thereto by a manifold 13. A vacuum feed tank 14 is arranged above and connected in the usual manner by a pipe 12' to the carburetor 12 and through a pipe 15 with the manifold 13. The vacuum feed tank 14 has a pipe 16, which is carried upon the body 10, and leads to a suitable fuel tank or holder 17, the pipe 16 extending through and downwardly into the fuel tank 17, preferably terminating near the bottom thereof.

Mounted upon the instrument board, vehicle dash or other suitable location upon the body 10 is a hydrostatic gage 18 (best shown at the top of Fig. 2), preferably comprising a substantially U-shaped body having a long arm 18' of relatively small diameter and a short arm 19 of relatively large diameter. The arms 18', 19, of the U-shaped body 18 are preferably connected by a tube the inner diameter of which is relatively small to retard rapid flow of the liquid from one arm to the other, due to bodily movements of the vehicle. A body of liquid 20 is placed in this U-shaped member 18 and, to retard evaporation, it may be protected at its surface levels in the arms 18' and 19 by a surface layer of oil or other relatively non-volatile liquid. The long arm 18' is open to the atmosphere at its top, while the shorter arm 19 is connected at its upper end to one end of a pipe or tube 22 which extends to the top of the fuel tank 17 and into or through an opening 22' formed in a cap 23 secured in and removably closing an opening 23' formed on the top of the tank. The cap 23 carries a depending pipe or tube 24 which communicates with the tube 22 and forms a continuation of the latter. The pipe 24 is preferably of relatively large diameter for the purpose of insuring drainage of fuel therefrom due to it being splashed into the pipe or tube.

The arm 18' of hydrostatic gage 18 is associated with a plate 18ª carrying suitable graduations, constituting a scale whereby variations in the height of the liquid in the arm or column 18' can be easily read and determined.

25 indicates a container connected with the lower end of the pipe 24, communicating with the interior of the holder 17 and arranged to trap air, whereby the pressure or head of a column of fuel in the holder 17 may be communicated through the pipes 24 and 22 to act on the liquid in the arm or leg 19 of the gage 18. The trap 25 is in the form of a relatively small sealed tank, compartment or container, preferably comprising a cylindrical body closed at its opposite ends. The trap is preferably of such size that it, as well as the pipe 24 or other pipe (to which reference will later be made), may be positioned in the holder 17 and removed therefrom, at will, through the opening 23', for which purpose the pipe 24 may be rigidly connected to the cap 23. As shown in the present instance, the trap 25 is placed directly in the fuel holder, preferably at the lowest point therein, but it may be otherwise suitably located for the purpose of accomplishing the results of this invention. The trap 25 communicates at its lower end with the interior of the fuel holder 17 preferably by a pipe or tube 26 which may be of relatively small diameter.

The pipes 16 and 26 are preferably in communication with each other for purposes to be later set forth. In carrying out this preferred form of construction, the pipe 26 is provided with an up-turned free end, which extends into the open end of the fuel discharge pipe 16, this arrangement being particularly advantageous where the fuel is fed to the carbureter 12 from a vacuum tank 14 by a vacuum feed means, for reasons which will later be set forth. The pipe 26 is of such size that it will leave ample space around it for the fuel to pass into the pipe 16. 26' indicates an opening formed in the pipe 26 at a point between the trap 25 and its connection with the pipe 16. The opening 26' serves to permit the pressure or head of fuel in the holder 17 to be transmitted through it to the trap 25 to compress the air in the latter.

If desired, the opening 26' may be omitted, in which event the pressure or head of liquid will be communicated through the outer end of the pipe 26 to the trap 25.

The opening 26' also serves as a supplemental inlet to permit the fuel to enter the pipe 26 and flow to and through the pipe 16.

For the purpose of maintaining the necessary volume of air in the trap 25 and the tubes 24 and 22, the trap is provided with an air supply pipe 27. The outer end of the pipe 27 communicates with the atmosphere; its opposite end is connected to the trap 25, and arranged so that its open free end is disposed in the lower portion thereof. Where the trap 25 is arranged in the holder 17, the pipe 27 may rise through the fuel holder 17 to the cap 23 to receive air therethrough. For this purpose, the cap 23 (see Fig. 4) has a threaded opening 28 in its top, which registers with the pipe 27. The opening 28 is closed by a screw plug 29, or the like, provided with openings 30 through which air may pass to the pipe 27. By preference, a screen 27' may be provided in the opening 28. The pipe 27 may be rigidly connected to the cap 23 in any desired manner so as to be removed therewith.

The purpose of the pipe 27 is to supply air to the trap 25 so that any air which may be absorbed by the fuel or otherwise be lost from the system, will be replaced by air supplied through the pipe 27. Where my improved indicating apparatus is associated with a fuel holder, from which the fuel is caused to be discharged by a vacuum or vacuum operating apparatus, the suction effect incident to each operation thereof, will not only draw the required amount of fuel to the vacuum feed tank 14, but will also create a pressure in the trap 25 slightly below one atmosphere. As a result of this reduced pressure, air will be drawn into the trap 25 through the pipe 27 and replace that which has or may have been absorbed by the liquid or otherwise lost, thus re-setting the system so that it will again accurately indicate the height of the liquid in the holder 17. The reduced pressure thus created in each operation of the vacuum operating means will cause the liquid in the leg 18' to drop, but upon the completion of the vacuum feed operation, the indicating column in the leg 18' will rise therein and accurately indicate the height of the liquid then remaining in the holder 17.

From the foregoing description, it will be seen that (1) the pressure system is re-set each time fuel is delivered to the vacuum feed tank 14 without creating an undesirable suction on the gage 18 and (2) the trap 25 will be automatically refilled with the correct amount of air required to effect an accurate reading on the scale 18ª.

From the foregoing description it will be seen that my invention (1) may be used to indicate liquid levels in tanks or holders of various kinds, and (2) lends itself admirably for use in connection with holders from which the liquid is discharged by a vacuum feed apparatus, since the vacuum effect serves to draw air into the trap through the air supply pipe and thus automatically maintains the latter or the pressure system filled with the proper or required amount of air to insure its accurate operation in transmitting the pressure to the gage.

It will be understood that the pressure system may be associated with any other forms of pressure gages than that disclosed herein.

Where a vacuum feed is provided, I prefer to connect the intake pipe 26 at some suitable point with the supply 16, for example as shown and described herein, since in such arrangement a part of the suction effect of the engine will be transmitted direct to the trap 25 and through it to the pipe 27. This arrangement insures a sufficient supply of air to or the required volume of air in the trap 25 and maintains the pressure system in proper operating condition to insure accurate indications on the column 18'.

It is obvious that various changes and modifications may be made in the details of construction and design of the above described embodiment of my invention without departing from the spirit thereof, such changes and modifications being restricted only by the scope of the appended claim.

What I claim is:

In apparatus of the class described, the combination with a liquid holder, a fuel withdrawing conduit leading from adjacent the bottom of said holder, means to intermittently withdraw feul from said holder through said conduit, an air trap, an air supply pipe connecting the lower part of said trap with the atmosphere above said holder, a pressure responsive gauge, a gauge pipe connecting said gauge with the upper part of said trap, and a suction pipe having an orifice therein of substantially less area than the cross-section of the suction pipe, said suction pipe communicating with said air trap and extending into said conduit and affording free passage around itself and within the conduit for the fuel, whereby the withdrawal movement of fuel at intervals in said conduit will cause an entrainment of the contents of the suction pipe and a delivery of air through said air supply pipe into said trap to maintain a proper volume of air in said gauge and gauge pipe for accurate indications by said gauge during the intervals between such intermittent movement of fuel; and whereby said orifice will restore liquid to said trap during the intervals between such withdrawals of fuel through the fuel conduit.

In testimony whereof, I have hereunto subscribed my name.

HAROLD D. BLAKE.